United States Patent
Wang et al.

(10) Patent No.: US 10,084,729 B2
(45) Date of Patent: Sep. 25, 2018

(54) APPARATUSES AND METHODS FOR WEB PAGE SHARING

(71) Applicant: Tencent Technology (Shenzhen) Company Limited, Shenzhen, Guangdong (CN)

(72) Inventors: Xi Wang, Guangdong (CN); Wei Li, Guangdong (CN); Tingyong Tang, Guangdong (CN); Zhipei Wang, Guangdong (CN); Hao Tang, Guangdong (CN); Kai Zhang, Guangdong (CN); Xin Qing, Guangdong (CN); Sirui Liu, Guangdong (CN); Huijiao Yang, Guangdong (CN); Ying Huang, Guangdong (CN); Yulei Liu, Guangdong (CN); Cheng Feng, Guangdong (CN); Bo Hu, Guangdong (CN); Ruiyi Zhou, Guangdong (CN); Lei Guan, Guangdong (CN); Bosen He, Guangdong (CN); Ning Ma, Guangdong (CN); Yingge Li, Guangdong (CN); Yang Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 452 days.

(21) Appl. No.: 14/290,640

(22) Filed: May 29, 2014

(65) Prior Publication Data
US 2014/0379824 A1    Dec. 25, 2014

Related U.S. Application Data

(63) Continuation of application No. PCT/CN2013/089589, filed on Dec. 16, 2013.

(30) Foreign Application Priority Data

Jun. 25, 2013 (CN) .......................... 2013 1 0257188

(51) Int. Cl.
*H04L 12/58* (2006.01)
*G06F 17/22* (2006.01)

(52) U.S. Cl.
CPC ............ *H04L 51/04* (2013.01); *H04L 51/046* (2013.01)

(58) Field of Classification Search
CPC .... G06Q 50/01; G06Q 30/0631; H04L 67/02; H04L 67/2833; H04L 67/10; H04L 51/04;
(Continued)

(56) References Cited

U.S. PATENT DOCUMENTS 8,438,289 B1    5/2013  Grieve et al.
8,533,284 B2 *  9/2013  Shoemaker ............ G06Q 10/10
                                            709/204

(Continued)

FOREIGN PATENT DOCUMENTS

CN    102111454 A    6/2011
CN    102891897 A    1/2013
(Continued)

OTHER PUBLICATIONS wikiHow, "How to Post a YouTube Video on Facebook," May 2013, www.wikihow.com, https://web.archive.org/web/20130512170258/http://www.wikihow.com/Post-a-YouTube-Video-on-Facebook.*

(Continued)

*Primary Examiner* — Ruolei Zong
(74) *Attorney, Agent, or Firm* — Brinks Gilson & Lione

(57) ABSTRACT

A method for web page sharing may include receiving, by at least one processor, a triggering operation executed on an interface of a current application running on a terminal device by a user of the terminal device; calling, by at least one processor, a sharing interface of a target application from the interface of the current application in response to the triggering operation; displaying, by at least one proces-
(Continued)

sor, a plurality of contacts of the user associated with the target application on the sharing interface of the target application; receiving, by at least one processor, a first selection operation from the user to select a contact of the user from the plurality of contacts; generating, by at least one processor, a sharing message in response to the first selection operation; and sending, by at least one processor, the sharing message to the selected contact through the server.

13 Claims, 5 Drawing Sheets

(58) Field of Classification Search
CPC ....... H04L 51/046; H04L 51/36; H04L 51/14; H04L 51/32; H04L 51/10
USPC .......................... 709/206, 204, 205, 217–219
See application file for complete search history.

(56) References Cited

U.S. PATENT DOCUMENTS

| | | | | |
|---|---|---|---|---|
| 9,230,241 | B1* | 1/2016 | Singh | ........................ G06F 3/00 |
| 2009/0125511 | A1* | 5/2009 | Kumar | ................ G06Q 10/107 |
| 2009/0234876 | A1* | 9/2009 | Schigel | ............. G06F 17/30873 |
| 2010/0070899 | A1* | 3/2010 | Hunt | ..................... G06F 3/0486 715/769 |
| 2012/0110064 | A1* | 5/2012 | Chen | ..................... G06Q 10/10 709/203 |
| 2013/0066922 | A1 | 3/2013 | Jang et al. | |
| 2013/0282839 | A1* | 10/2013 | Alcala | ................... G06Q 50/01 709/206 |

FOREIGN PATENT DOCUMENTS

| | | |
|---|---|---|
| CN | 102917070 A | 2/2013 |
| WO | 2013/009296 A1 | 1/2013 |

OTHER PUBLICATIONS

Kit Eaton, "You Are Now Entering the Touchscreen Smartphone Era", Nov. 2009, fastcompany.com, www.fastcompany.com/1439675/you-are-now-entering-touchscreen-smartphone-era.*

International Search Report dated Apr. 3, 2014 in International Application No. PCT/CN2013/089589.

Written Opinion dated Apr. 3, 2014 in International Application No. PCT/CN2013/089589.

Lihua Lin, Sharing Wonderful Contents by Pressing a Single Key, CPC Fan, vol. 3, 2011, p. 77, Mar. 31, 2011.

* cited by examiner

APPARATUSES AND METHODS FOR WEB PAGE SHARING

PRIORITY STATEMENT

This application is a continuation of International Application No. PCT/CN2013/089589, filed on Dec. 16, 2013, in the State Intellectual Property Office of the People's Republic of China, which claims the priority benefit of Chinese Patent Application No. 201310257188.3 filed on Jun. 25, 2013, the disclosures of which are incorporated herein in their entirety by reference.

FIELD

The present disclosure relates to interne application technology. Specifically, the present disclosure relates to methods and apparatuses for sharing web pages.

BACKGROUND

When surfing online with a browser operating on a computer or smart phone, users often navigate through web pages and wish to share with others some pages they like. For example, when a user is browsing a web page, she/he may copy the URL in the browser address bar, paste the copied URL link to an instant messaging window (e.g., MSN or QQ) to share the page with a friend chatting in the messaging window in real time. After receiving the URL, the friend may click on the link pasted in the window, and browse the page.

This example of web page sharing requires switching between the browser and the instant messaging tool, which means the user must have installed the instant messaging tool in addition to the browser.

SUMMARY

According to an aspect of the present disclosure, a method for web page sharing may include receiving, by at least one processor, a triggering operation executed on an interface of a current application running on a terminal device from a user of the terminal device; calling, by at least one processor, a sharing interface of a target application from the interface of the current application in response to the triggering operation; displaying, by at least one processor, a plurality of contacts of the user associated with the target application on the sharing interface of the target application; receiving, by at least one processor, a first selection operation from the user to select a contact of the user from the plurality of contacts; generating, by at least one processor, a sharing message in response to the first selection operation; and sending, by at least one processor, the sharing message to the selected contact through the server.

According to another aspect of the present disclosure, an apparatus may include at least one non-transitory processor-readable storage medium and at least one processor in communication with the at least one storage medium. The at least one storage medium may include at least one set of instructions for content sharing. The at least one processor is configured to execute the at least one set of instructions to: receive a triggering operation executed on an interface of a current application running on a terminal device from a user of the terminal device; call a sharing interface of a target application from the interface of the current application in response to the triggering operation; display a plurality of contacts of the user associated with the target application on the sharing interface of the target application; receive a first selection operation from the user to select a contact of the user from the plurality of contacts; generate a sharing message in response to the first selection operation; and send the sharing message to the selected contact through the server.

According to yet another aspect of the present disclosure a non-transitory processor readable storage medium may include at least one set of instructions for content sharing. The at least one set of instructions is configured to be executed by at least one processor and direct the at least one processor to perform acts of: receiving a triggering operation executed on an interface of a current application running on a terminal device from a user of the terminal device; calling a sharing interface of a target application from the interface of the current application in response to the triggering operation; displaying a plurality of contacts of the user associated with the target application on the sharing interface of the target application; receiving a first selection operation from the user to select a contact of the user from the plurality of contacts; generating a sharing message in response to the first selection operation; and sending the sharing message to the selected contact through the server.

These and other advantages, aspects, and novel features of the present disclosure, as well as details of illustrated embodiments thereof, will be more fully understood from the following description and drawings.

DETAILED DESCRIPTION

Figure 6:
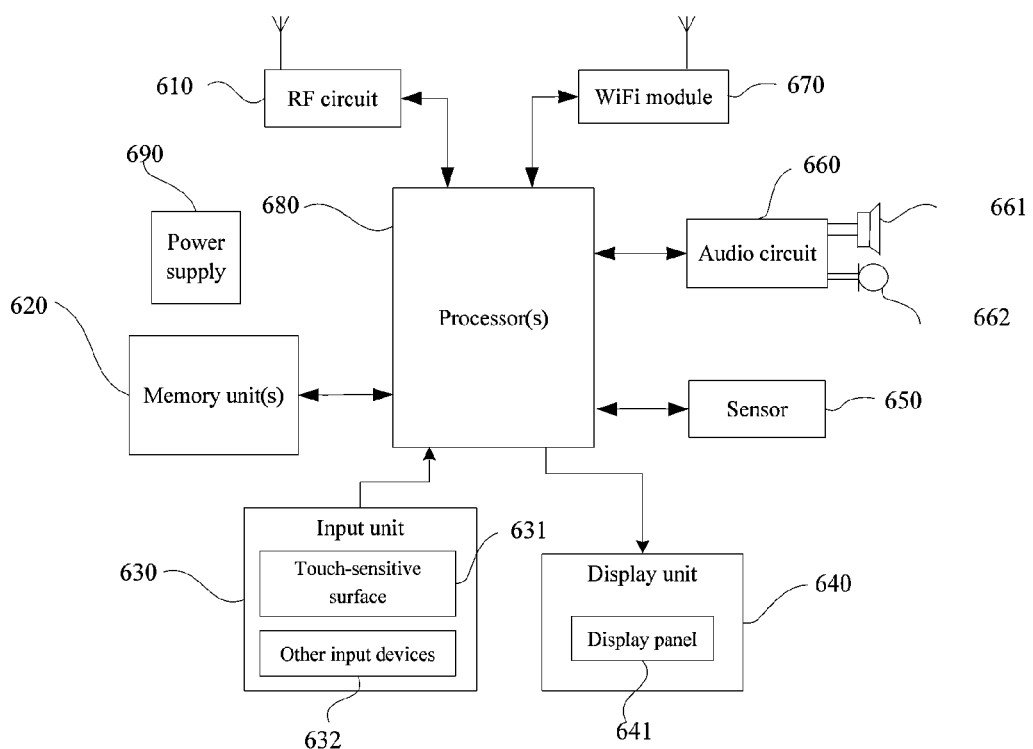
FIG. 6 is a block diagram for an intelligent terminal device according to the example embodiments of the present disclosure.

FIG. 6 illustrates a structural diagram of an intelligent terminal according to the example embodiments of the present disclosure. The intelligent terminal may be implemented as systems and/or to operate methods disclosed in the present disclosure.

The intelligent terminal may include an RF (Radio Frequency) circuit 610, one or more than one memory unit(s) 620 of computer-readable memory media, an input unit 630, a display unit 640, a sensor 650, an audio circuit 660, a WiFi (wireless fidelity) module 670, at least one processor 680, and a power supply 690. Those of ordinary skill in the art may understand that the structure of the intelligent terminal shown in FIG. 6 does not constitute restrictions on the intelligent terminal. Compared with what may be shown in the figure, more or fewer components may be included, or certain components may be combined, or components may be arranged differently.

The RF circuit 610 may be configured to receive and transmit signals during the course of receiving and transmitting information and/or phone conversation. Specifically, after the RF circuit 610 receives downlink information from a base station, it may hand off the downlink information to the processor 680 for processing. Additionally, the RF circuit 610 may transmit uplink data to the base station. Generally, the RF circuit 610 may include, but may be not limited to, an antenna, at least one amplifier, a tuner, one or multiple oscillators, a subscriber identification module (SIM) card, a transceiver, a coupler, an LNA (Low Noise Amplifier), and a duplexer. The RF circuit 610 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 620 may be configured to store software programs and/or modules. The software programs and/or modules may be sets of instructions to be executed by the processor 680. The processor 680 may execute various functional applications and data processing by running the software programs and modules stored in the memory unit 620. The memory unit 620 may include a program memory area and a data memory area, wherein the program memory area may store the operating system and at least one functionally required application program (such as the audio playback function and image playback function); the data memory area may store data (such as audio data and phone book) created according to the use of the intelligent terminal. Moreover, the memory unit 620 may include high-speed random-access memory and may further include non-volatile memory, such as at least one disk memory device, flash device, or other volatile solid-state memory devices. Accordingly, the memory unit 620 may further include a memory controller to provide the processor 680 and the input unit 630 with access to the memory unit 620.

The input unit 630 may be configured to receive information, such as numbers or characters, and create input of signals from keyboards, touch screens, mice, joysticks, optical or track balls, which are related to user configuration and function control. Specifically, the input unit 630 may include a touch-sensitive surface 631 and other input devices 632. The touch-sensitive surface 631, also called a touch screen or a touch pad, may collect touch operations by a user on or close to it (e.g., touch operations on the touch-sensitive surface 631 or close to the touch-sensitive surface 631 by the user using a finger, a stylus, and/or any other appropriate object or attachment) and drive corresponding connecting devices according to preset programs. The touch-sensitive surface 631 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen may be contacted, and then send the touch point coordinates information to the processor 680. The touch controller may also receive commands sent by the processor 680 for execution. Moreover, the touch-sensitive surface 631 may be realized by adopting multiple types touch-sensitive surfaces, such as resistive, capacitive, infrared, and/or surface acoustic sound wave surfaces. Besides the touch-sensitive surface 631, the input unit 630 may further include other input devices 632, such as the input devices 632 may also include, but not limited to, one or multiple types of physical keyboards, functional keys (for example, volume control buttons and switch buttons), trackballs, mice, and/or joysticks.

The display unit 640 may be configured to display information input by the user, provided to the user, and various graphical user interfaces on the intelligent terminal. These graphical user interfaces may be composed of graphics, texts, icons, videos, and/or combinations thereof. The display unit 640 may include a display panel 641. The display panel 641 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 631 may cover the display panel 641. After the touch-sensitive surface 631 detects touch operations on it or nearby, it may transmit signals of the touch operations to the processor 680 to determine the type of the touch event. Afterwards, according to the type of the touch event, the processor 680 may provide corresponding visual output on the display panel 641. In FIG. 6, the touch-sensitive surface 631 and the display panel 641 realize the input and output functions as two independent components. Alternatively, the touch-sensitive surface 631 and the display panel 641 may be integrated to realize the input and output functions.

The intelligent terminal may further include at least one type of sensor 650, for example, an optical sensor, a motion sensor, and other sensors. An optical sensor may include an environmental optical sensor and a proximity sensor, wherein the environmental optical sensor may adjust the brightness of the display panel 641 according to the brightness of the environment, and the proximity sensor may turn off the display panel 641 and/or back light when the intelligent terminal may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the intelligent terminal (e.g., switching screen orientation, related games, and magnetometer calibration) and functions related to vibration recognition (e.g., pedometers and tapping); the intelligent terminal may also be configured with a gyroscope, barometer, hygrometer, thermometer, infrared sensor, and other sensors.

An audio circuit 660, a speaker 661, and a microphone 662 may provide audio interfaces between the user and the intelligent terminal. The audio circuit 660 may transmit the electric signals, which are converted from the received audio data, to the speaker 661, and the speaker 661 may convert them into the output of sound signals; on the other hand, the microphone 662 may convert the collected sound signals into electric signals, which may be converted into audio data after they are received by the audio circuit 660; after the audio data may be output to the processor 680 for processing, it may be transmitted via the RF circuit 610 to, for example, another terminal; or the audio data may be output to the memory unit 620 for further processing. The audio circuit 660 may further include an earplug jack to provide communication between earplugs and the intelligent terminal.

WiFi may be a short-distance wireless transmission technology. Via the WiFi module 670, the intelligent terminal may help users receive and send emails, browse web pages, and visit streaming media. The WiFi module 670 may provide the user with wireless broadband Internet access.

The processor 680 may be the control center of the intelligent terminal. The processor 680 may connect to various parts of the entire intelligent terminal utilizing various interfaces and circuits. The processor 680 may conduct overall monitoring of the intelligent terminal by running or executing the software programs and/or modules stored in the memory unit 620, calling the data stored in the memory unit 620, and executing various functions and processing data of the intelligent terminal. The processor 680 may include one or multiple processing core(s). The processor 680 may integrate an application processor and a modem processor, wherein the application processor may process the operating system, user interface, and application programs, and the modem processor may process wireless communication.

The intelligent terminal may further include a power supply 690 (for example a battery), which supplies power to various components. The power supply may be logically connected to the processor 680 via a power management system so that charging, discharging, power consumption management, and other functions may be realized via the power management system. The power supply 690 may further include one or more than one DC or AC power supply, a recharging system, a power failure detection circuit, a power converter or inverter, a power status indicator, and other random components.

Further, the intelligent terminal 600 may also include a camera, Bluetooth module, etc., which are not shown in FIG. 6.

Figure 1:
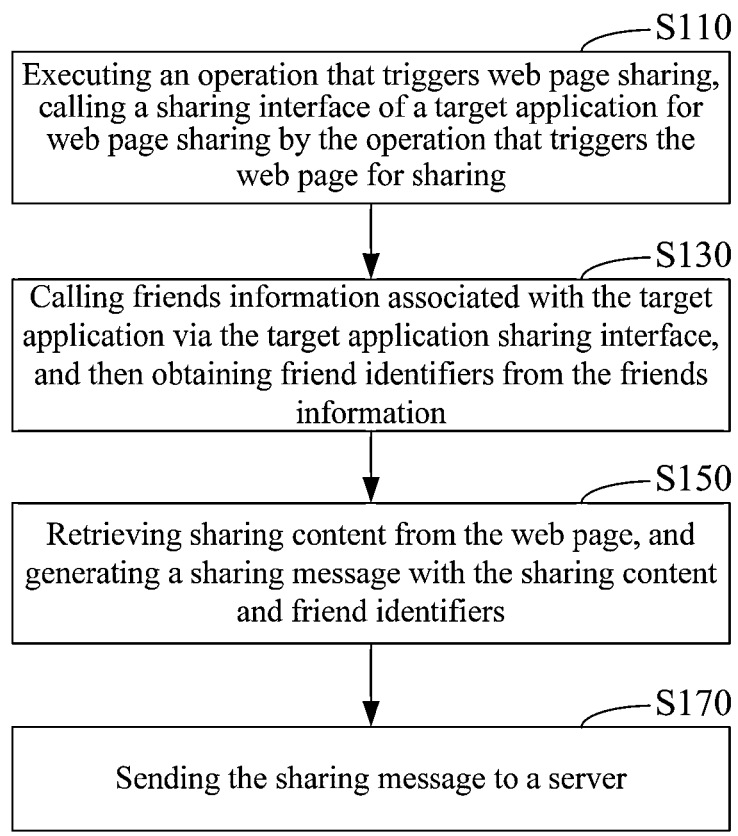
FIG. 1 illustrates a process of web page sharing method according to example embodiments of the present disclosure.

FIG. 1 illustrates a process of web page sharing method according to example embodiments of the present disclosure. The method may be implemented to the intelligent terminal as shown in FIG. 6, and executed by the intelligent terminal to perform the following steps:

Step S110: the intelligent terminal may receive a triggering operation that triggers a web page sharing operation. The operation may be conducted by a user of the intelligent terminal. In response to the triggering operation, the intelligent terminal may call a target application for web page sharing through a sharing interface of the target application.

This step may occur when a user of the intelligent terminal conduct an operation (i.e., the triggering operation) intending to share a web page with a friend. The intelligent terminal (i.e., the processor of the intelligent terminal) may first detect the operation for initiating sharing of the currently browsed web page, so that the intelligent terminal may be able to direct a target application for web page sharing before calling a sharing interface corresponding to such target application. The sharing interface of the target application may be an interface provided by the target application to a web browsing application (e.g., a web browser) containing the web page. By calling the sharing interface of the target application alone, the web browsing application may be able to call part of the target application's functions and resources to fulfill the purpose of web page sharing.

For example, the target application may be an instant messaging application (i.e., MSN, QQ etc.) and/or a virtual network social application etc. configured to be embedded in a web browser. When the user uses a browser to browse web pages and wishes to share a web page with a friend, the browser may call the embedded sharing interface of the target application alone, thereby calling part of the functions and resources of the target application instead of calling or running the entire target application.

Accordingly, Step S110 may include: obtaining a candidate menu for web page sharing from an interface of a web page; selecting an operation from the candidate menu to enact the target web sharing operation; then calling the sharing interface of the target operation.

The interface of the web page may include the address bar with the page URL and/or web page sharing control of the web page. By triggering the sharing control, the user of the intelligent terminal may open and/or enter a menu of candidate applications (i.e., the candidate menu) on the interface of the web page (or an interface of the web browser). The candidate menu may include a number of candidate applications available for web sharing. The user may choose any one of them as he/she wishes. The candidate application chosen by the user may be the target application for web page sharing. When the user chooses the target application, the intelligent terminal may call the corresponding sharing interface of the target application.

Step S130, the intelligent terminal may call friends information of the user saved in a server communicated with the target application via the target application sharing interface, and then from the friends information, the intelligent terminal may obtain identifiers of the user's friends for sharing the web page.

In this step, the intelligent terminal may receive contacts of the user through the target application, wherein each contact has an account in the server that communicates to the intelligent terminal through the target application. For example, the intelligent terminal may call the sharing interface of the target application to obtain the users' friends information saved of the target application. From such friends information, the intelligent terminal may obtain the identifiers of each of the user's friends. Each identifier may correspond with a friend of the user. The user may select a target identifier from the identifiers of his/her friends to share the web page, thereby sharing the web page with the corresponding target friend.

For example, if the target application is an instant messaging tool (e.g., MSN, QQ, etc.), the friends information called via the sharing interface of the target application may be the information of the user's friends saved in the instant messaging tool. The friends information may contain only the friends that users has been in touch with recently through the instant messaging tool. The friends information may also contain an identifier (e.g., nickname and/or account number of a friend shown on the instant messaging tool) for each friend. Alternatively, the friends information may also contain all friends the user has in the instant messaging tool, as well as the identifiers for each friend.

Step S150: the intelligent terminal may retrieve sharing content in the web page, and generate a sharing message that associates with the sharing content and the friend's identifier.

In this step, the intelligent terminal may generate the sharing message, which associates the sharing content of the web page and the identifiers of friends who is to share the web page with the user. The sharing message may denominate one or more than one friends' identifier to share the web page.

Step S150 may include: retrieving the URL, content abstract and preview image of the web page, and generating sharing message containing the URL, content abstract and preview image as well as friend's identifiers.

The friend with whom the web page is to be shared may be able to browse the content abstract and preview image of the web page to be shared to get a rough idea about the page, and if he/she is interested in the page, the friend may click the corresponding URL for details of the web page.

Step S170: the intelligent terminal may send the sharing message to the server that provides a web page sharing service.

The server may send the sharing content in the sharing message based on the identifiers of the friends contained in the sharing message. To this end, the web browsing application containing the web page may send the sharing message generated to the server. The server may determine if the friends listed in the sharing message is online. If yes, the server may send the sharing message based on the friends' identifiers; if not, the server may cache the sharing message and send the sharing message when the friends show up online (i.e., when the friends log in the target application from intelligent terminals and/or a computers of the friends, so that the friends may be available to receive the sharing message).

After the sharing message is sent to the server, the intelligent terminal may close the sharing interface and terminate the executing of the target application unless the target application has been opened and run before calling of the sharing interface. Alternatively, the intelligent terminal may keep the sharing interface running.

The above mentioned web page sharing method may enable fast page sharing via the application containing the web page, such as a browser. It may effectively reduce manual operations needed by the users, eliminate switch between applications, so that users do not need to suspend what they are doing while browsing and sharing web pages, which improves the smooth flow of the applications.

When the above mentioned web page sharing method is applied to hand held devices with limited screen sizes, it may eliminate the need for switching between applications or pressing and holding in order to copy and paste the link, etc., which may reduce the operational cost for web page sharing and increase the application usability and sharing speed.

Figure 2:
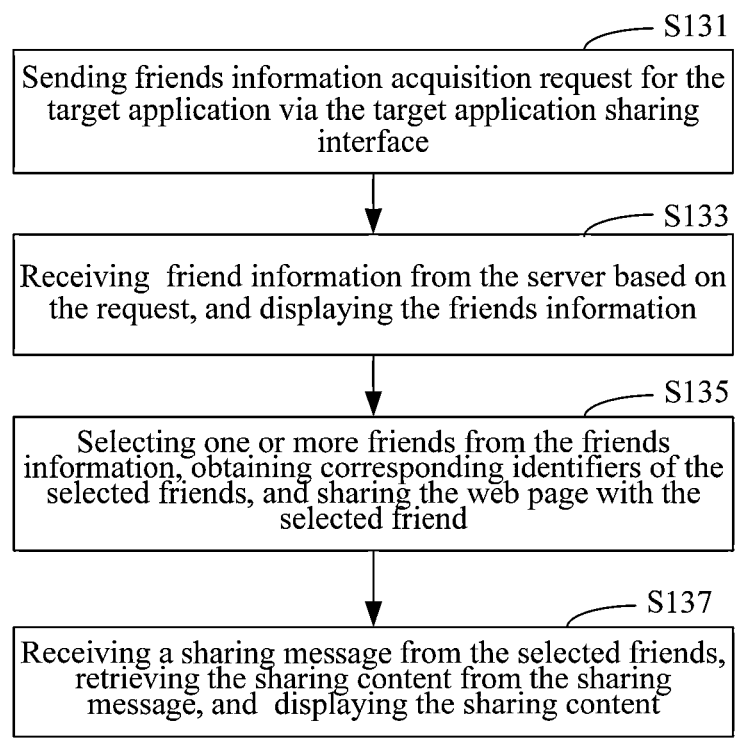
FIG. 2 illustrates details of a step in the web page sharing method according to the example embodiments of the present disclosure.

FIG. 2 illustrates details of Step 130 in the web page sharing method according to the example embodiments of the present disclosure. Step S130 may further include:

Step S131: the intelligent terminal may initiate friends information acquisition request from the target application via the sharing interface of the target application.

In this step, the sharing interface of the target application may be used to receive friends information and send the sharing message to corresponding friends.

After calling the sharing interface of the target application, the friends information acquisition request may be sent via the sharing interface to the server corresponding to the target application. At this time the server may conduct identification authentication of the user to ensure that the legality of the user to call the friends information.

Further, the friends information acquisition request may be sent via the sharing interface of the target application to the server. At this time, the target application's login interface may be called to obtain and authenticate the user name and password entered by the user. If the authentication is confirmed, i.e., the user's identification is verified, the friends information request may be accepted by the server.

Step S133: the intelligent terminal may receive the friends information from the server based on the request, and display the friends information.

In this step, the server may send the friends information to the intelligent terminal based on the request. The friends information may include the friends' nicknames and identifiers, etc. Upon receiving the friends information responded by the server, the friends information may be presented in a friends table and displayed on the sharing interface to facilitate the user to find who he/she wants to share the page with.

Step S135: through the intelligent terminal, the user may select one or more of his/her friends shown on the sharing interface, thereby obtaining the corresponding friends' identifiers.

In this step, the intelligent terminal may display the friends information (e.g., the nickname of each friend) received from the server. The user of the intelligent terminal may select one or more friends therefrom. Accordingly, the intelligent terminal may obtain the corresponding identifiers of the selected friends.

Step S137, the above method may also include: the intelligent terminals may receive sharing messages sent to the user by friends that the user selected based on the friend's identifiers, retrieve the sharing content from the sharing message, and then display the sharing content on the sharing interface of the intelligent terminal.

In additional to sending sharing messages to other friends, the intelligent terminal may also receive web page sharing messages conducted by other friends during the web page sharing. The intelligent terminal may receive sharing message sent from other friends through the server, and the sharing content therein may be retrieved and displayed.

Figure 3:
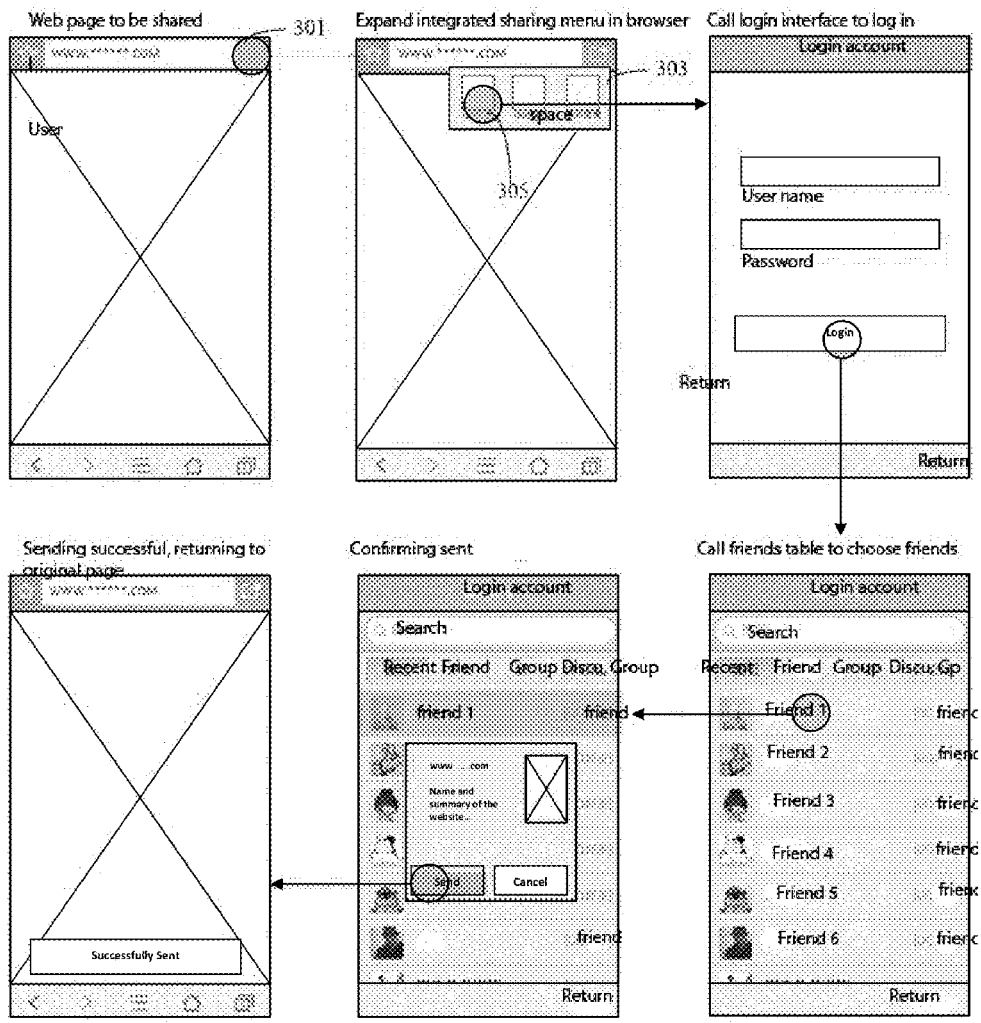
FIG. 3 is a schematic diagram of an implementation of the web page sharing method according to the example embodiments of the present disclosure.

FIG. 3 is a schematic diagram of an implementation of the web page sharing method according to the example embodiments of the present disclosure. A sharing control 301 may be integrated in a browser and displayed at the right side of the address bar of the browser. When a user browses a web page using the browser and wants to share the current page with his/her friends in an instant messaging application, such as his/her friends in MSN and/or QQ, he/she may click the sharing control 301, rendering a candidate application menu (i.e., a candidate menu) 303 to pop up. The candidate application menu may include a list of various candidate applications to share the web page. For example, icons of various candidate applications may be listed in the candidate application menu to provide the source of friends to share the web page with. When the number of candidate applications is too large to visually comfortably show on a screen of the intelligent terminal, the candidate application menu may adopt a collapse form so that the user may choose to click and expand the candidate application menu 303.

The user may select and click an icon from any one of the various candidate applications in the candidate application menu 303, e.g., the sharing application icon 305. The candidate application clicked by the user then may be the target application for web page sharing. In response to the selection, the intelligent terminal may call a sharing interface of the corresponding target application.

The interface of the target application may initiate a friends information acquisition request to call and obtain the login interface of the target application. After the user enters the correct user name and password on the login page to log in, the intelligent terminal may call the corresponding friends information and display it in a friends table.

The user may choose any friend in the friends table to share the web page. After that, the intelligent terminal may retrieve the URL, content abstract, and preview image of the web page and generate a sharing message with the URL, content abstract and preview image as well as friend's identifiers. The intelligent terminal then may send the sharing message to the server that communicates with the target application. The server then may send the sharing message to the selected friends according to their respective identifiers. Once the sharing message has been sent out, the intelligent terminal may return back to the original web page.

Figure 4:
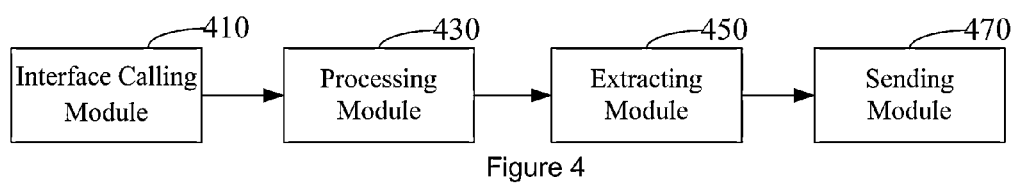
FIG. 4 illustrates a structural diagram of a web page sharing apparatus according to the example embodiments of the present disclosure.

FIG. 4 illustrates a structural diagram of a web page sharing apparatus according to the example embodiments of the present disclosure. The web page sharing mechanism may include an interface call module 410, a processing module 430, a retrieval module 450, and a transmission module 470.

The interface call module 410 may be configured to call the sharing interface of the target application by the operation that triggers web page sharing.

The interface call module 410 may detect the operation that triggers the current web page for sharing. When the interface call module detects the operation, it may obtain the target application for web page sharing based on this operation, and call the sharing interface corresponding to the target application. The sharing interface of the target application may be an interface of the target application that is shown on the application containing the web page (e.g., the sharing interface may be an interface of QQ displayed on Internet Explorer). By calling the sharing interface through the application that contains the web page, a user may be able to operate and/or execute part of the target application's functions.

For examples, a browser may be used to browser web pages and a target application may be an instant messaging tool, a virtual social network tool, etc. The sharing interface of the target application may be embedded in the browser so that when the browser calls the embedded sharing interface of the target application, it may call part of the functions and resources of the target application, hence, eliminating the need to load and run the entire target application.

The above mentioned interface call module 410 may be also configured to acquire and/or obtain the target application for the sharing page in the interface containing the web page, and call the sharing interface of the target application.

The interface containing the sharing page may include the address bar with the page URL and web page sharing control. By triggering the sharing control, a user may enter the candidate applications menu of the sharing page. The candidate applications menu may include a number of candidate applications available for web sharing to be used by the user as he/she wishes; the candidate application chosen by the user may be the target application for page sharing, and the corresponding sharing interface of the target application may be called by the interface call module 410.

The processing module 430 may be configured to call the friends information of the target application via the sharing interface of the target application, and from the friends information obtain the identifiers of friends to whom the user wishes to share the web page.

The processing module 430 may call and obtain the user's friends information of the target application via the sharing interface of the target application, then from the friends information the processing module 430 may acquire the user's friends information in the target application and the friends' identifiers; then from the friends information the processing module 430 may obtain target friends who are currently engaged in web page sharing as well as identifiers of such target friends.

For example, the target application may be an instant messaging tool. The friends information called and obtained by the processing module 430 via the sharing interface of the target application may be the information of the user's friends in such instant messaging tool. Such friends information may include all friends the user has been in touch with recently in the instant messaging tool, as well as the identifiers for each friend. Alternatively, the friends information may contain all friends the user has in the instant messaging tool, as well as the identifiers for each friend.

The retrieval module 450 may be configured to retrieve the sharing content of the web page, and generate sharing message with the sharing content and the friend's identifiers.

The retrieval module 450 may generate the sharing message with the sharing content of the web page and identifiers of friends who are to share the web page with the user.

In one embodiment the above mentioned retrieval module 450 may retrieve the URL, content abstract and preview image of the web page, and generate the sharing message with the URL, content abstract and preview image, as well as friend's identifiers.

Based on actual needs, the retrieval module 450 may also share the URL, content abstract, and preview image of the web page. The content abstract and preview image of the web page may enable the friends of the user with whom the user wish to share the web page to get a rough idea about the web page, so that if the friends of the user are interested in the page, they may click the corresponding URL in the sharing message for details.

The transmission module 470 may be configured to transmit the sharing message to the server.

The sharing content in the sharing message may be shared by the server based on the friend's identifiers. The transmission module 470 may send the sharing message to the server. The server may determine if the friends to whom the sharing message should be send are online based on the friend's identifiers in the sharing message. If yes, the server may send the sharing message based on the friend's identifiers; if not, the server may cache the sharing message to be sent and wait until the friends that the friend's identifiers in the sharing message represent show up online.

The above mentioned web page sharing mechanism may enable fast page sharing via the application containing the web page, such as a browser. It may effectively reduce manual operations needed by the users, eliminate switch between applications, and improve user experiences.

When the above mentioned web page sharing method is implemented in hand held devices with limited screen sizes, the methods may eliminate the need for switching between applications or pressing and holding in order to copy and paste the link, etc., which may greatly reduce the operational cost for web page sharing and increases the application usability and sharing speed.

Figure 5:
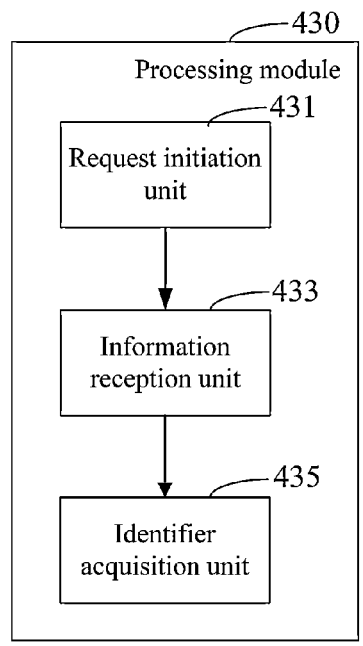
FIG. 5 illustrates a structural diagram of a processing module in the web page sharing apparatus according to the example embodiments of the present disclosure.

FIG. 5 illustrates a structural diagram of the processing module 430 in the web page sharing apparatus according to the example embodiments of the present disclosure. The processing module 430 may include a request initiation unit 431, an information reception unit 433, and an identifiers acquisition unit 435.

The request initiation unit 431 may be configured to initiate the friends information acquisition request for the target application via the sharing interface of the target application.

The sharing interface of the target application may be used to realize calling the friends information and sending the sharing content to the corresponding friends.

After obtaining the corresponding sharing interface of the target application, the request initiation unit 431 may send the friends information acquisition request via the sharing interface of the target application to the server corresponding to the target application. At this time the server corresponding to the target application may engage in user identification authentication in order to ensure that the legality of the user to call the friends information.

Further, the friends information acquisition request may be sent by the request initiation unit 431 via the sharing interface of the target application to the server corresponding to the target application. At this time, the target application's login interface may be called to obtain and authenticate the user name and password entered by the user. If the authentication is confirmed, this user's friends information may be called.

The information reception unit 433 may be configured to receive friends information sent from the server based on the friends information acquisition request, and display such friends information;

The friends information received by the server that may be returned based on the request may include friends' nicknames and identifiers, etc. After the information reception unit 433 receives the friends information returned by the server, the information reception unit 433 may present the friends information in a friends table and displayed to the user for each friend to facilitate the user to find with whom the user wants to share the page.

The identifiers acquisition unit 435 may be configured to obtain the identifiers of the friends with whom the user wishes to share the web page by selecting the corresponding displayed friends information.

The displayed friends information may contain friends selected by the user through chosen operations for web page sharing, from which the identifiers acquisition unit 435 may obtain the corresponding friend's identifiers.

The above mentioned web page sharing mechanism may also include a sharing reception module, which may be configured to receive the sharing message sent by the server based on friend's identifiers, and from the sharing message the sharing content may be retrieved and displayed.

During the web page sharing process, the sharing reception module may also receive web page sharing conducted by other friends, so that the sharing message sent by the server may be received by the sharing reception module, and the sharing content may be retrieved from the sharing message and displayed.

The above mentioned web page sharing method and mechanism may call the sharing interface of the target application of the sharing page by triggering the web page sharing operation, and further call the friends information of the target application via the sharing interface of the target application, and get the friend's identifiers of the sharing page from the friends information. The method and mechanism allows a user to call his/her friends information in the target application through the sharing interface, and then select some friends from the friends information to obtain the identifier of the selected friends. Based on the identifiers corresponding to the selected friend, the user may be able to share the web page he/she wish to share. No additional target application needs to be loaded for web page sharing.

Any technician in this field understands that the entire or part of the process in above embodiments may be achieved by hardware commanded under a computer program. Such program may be stored in a computer's readable medium. When the program is executed by one or more processor, it may direct the at least one processor to perform the processes for the above methods disclosed in the example embodiments. The memory medium may be a disk, CD-ROM, Read-Only Memory (ROM) or Random Access Memory (RAM).

Referring back to FIG. 6, illustrates a structural diagram of an intelligent terminal, which may implement in the web page sharing method disclosed above. The intelligent terminal may be any terminal device such as mobile phones, tablets, Personal Digital Assistant (PDA), Point of Sales (POS), and car PC etc. The method may be stored in at least one storage medium of the intelligent terminal as at least one set of instructions. At least one processor (hereinafter "the processor") of the intelligent terminal may be configured to execute the at least one set of instructions and conduct the following operations.

When a user of the intelligent terminal conduct the operation that triggers the web sharing operation, the processor may call the sharing interface of the target application from the sharing web page.

After the sharing interface is loaded, the processor may call the friends information in the target application via the sharing interface of the target application. Then the processor may obtain the friend's identifiers of the sharing web page from the friends information.

The processor may then retrieve the sharing content of the page, and generate sharing message with the sharing message and friend's identifiers.

The processor then may send the sharing message to the server.

The server may send the sharing message to the corresponding selected friends based on the friends' identifiers. As a result, the sharing content in the sharing message may be shared.

According to the example embodiments, to call the sharing interface of the target application the processor may also be configured to execute the at least one set of instructions to obtain the candidate menu from the interface that contains the web page to be shared, and from the candidate menu choose the target application from a plurality of candidate application listed in the candidate menu, and then call the sharing interface of the target application.

According to the example embodiments, to call the friends information in the target application through the sharing interface and to obtain the identifiers of friends with whom the user wish to share the webpage, the processor may further be configured to execute the at least one set of instruction to initiate the friends information acquisition request for the target application via the sharing interface of the target application; receive the friends information from the server based on the request, and display the friends information on the sharing interface. Under the user's instruction, the processor may execute an operation of friend selection to select the friend with whom the user wishes to share the web page, and obtain the corresponding identifiers of the selected friends.

According to the example embodiments, to retrieve the sharing content of the web page and to generate the sharing message that includes the sharing content and friend's identifiers, the processor may further configured to execute the at least one set of instructions to retrieve the URL, content abstract and preview image of the web page, and generate sharing message with the URL, content abstract and preview image as well as friend's identifiers.

According to the example embodiments, the processor may also receive a sharing message from a friend via the server, based on the friend's identifiers, retrieve the sharing content from the sharing message sent by the friend, and display the sharing content.

While example embodiments of the present disclosure relate to systems and methods for sharing a web page, the systems and methods may also be applied to other Applications. For example, in addition to share contents of a web page, the methods and systems may be used to share only a portion of the content in the web page, such as a picture on the web page. In addition to share content on a web page, the methods and systems may also be implemented to share content shown on other interface, such as sharing all or part of content in a PowerPoint file. The present disclosure intends to cover the broadest scope of systems and methods for content browsing, generation, and interaction.

Thus, example embodiments illustrated in FIGS. 1-6 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A method for sharing web pages, comprising:
running, concurrently, by at least one processor of a mobile device having a touch screen, a web browser application and a plurality of messaging applications, each of the messaging applications configured to communicate with a separate corresponding remote server;
displaying, by the at least one processor, a web page loaded by the web browser application at a first area of the touch screen of a device and an address bar in a second area of the touch screen of the device, the web browser including a sharing button in the second area of a display, the sharing button triggerable to load a candidate menu, the first area of the touch screen separate from the second area of the touch screen;
receiving, by the at least one processor, a first input signal directed to the sharing button from the touch screen of the device;
displaying, by the at least one processor, the candidate menu in response to the first input signal, the candidate menu including a plurality of candidate indicators corresponding to respective sharing interfaces in communication with messaging applications running on the mobile device, each of the respective sharing interfaces configured to communicate with a corresponding messaging application and load, from the corresponding messaging application, a corresponding set of contact options, the candidate menu loaded by the web browser application independent of the web page, a first portion of the candidate menu positioned over the sharing button in the second area of the touch screen and a second portion of the candidate menu positioned over the over the web page in the first area of the display;
receiving a second input signal from the touch screen of the device, the second input signal directed at a candidate indicator included in the candidate menu;
in response to receiving the second input signal directed at the candidate indicator:
displaying, by the at least one processor, in response to receipt of the second input signal, a sharing interface configured to independently communicate with a target messaging application included in the messaging applications, the sharing interface corresponding to the candidate indicator,
receiving, by the at least one processor, from the target messaging application running concurrently on the mobile device, a plurality of contact options, wherein each of the contact options are associated with an account in a remote server that communicates with the target messaging application, wherein the target messaging application previously received the contact options from the remote server, and
displaying, by the at least one processor, on the sharing interface, the contact options received from the target messaging application, each of the contact options responsive to user input and associated with a corresponding contact received from the target messaging application;
receiving, by the at least one processor, a contact selection operation indicative of a plurality of selected contact options from the contact options displayed on the sharing interface;
generating, by the at least one processor, a sharing message in response to the contact selection operation;
communicating, by the at least one processor, the sharing message to the target messaging application from the sharing interface, the sharing message including a link to a content of the web page, an abstract of the content, a preview image of the web page displayed via the touch screen, and a plurality of contacts identifiers corresponding to the selected contact options;
sending, by the at least one processor from the target messaging application, the sharing message to the remote server, the remote server configured to communicate the sharing message to the selected contact; and
closing, automatically in response to sending the sharing message, the sharing interface without closing the target messaging application.

2. The method of claim 1, wherein the step of displaying of the contact options further comprises:
sending a request of obtaining user contacts to the remote server via the the target messaging application.

3. The method of claim 1, further comprising:
receiving, by the at least one processor, a sharing message from a contact associated with the target messaging application, the sharing message being received through the remote server based on an identifier of the contact;
retrieving, by the at least one processor, a sharing content from the sharing message; and
displaying, by the at least one processor, the sharing content on the device.

4. A method for sharing a web page, comprising:
displaying, by at least one processor of a terminal device, a web page loaded by a web browser in a first display area of a touch screen of the terminal device;
receiving, by the at least one processor, a first input signal received by the terminal device;
displaying, by the at least one processor, a candidate menu in response to the first input signal, at least a portion of the candidate menu included in a second display area of the touch screen separate from the first display area of the touch screen, the second display area including an address bar of the web browser, the candidate menu including a plurality of candidate icons associated with respective messaging applications executing on the terminal device concurrently with the web browser, each of the candidate icons triggerable to call a corresponding sharing interface in communication with a corresponding one of the messaging applications;

receiving, by the at least one processor, a second input signal directed toward one of the candidate icons, the one of the candidate icons associated with a target application included in the respective messaging applications;

calling, by the at least one processor, a sharing interface in communication with a target application in response to receipt of the second input signal;

in response to calling the sharing interface:
 receiving, from the target application, a plurality of contact options, wherein each of the contact options are associated with an account on a remote server that communicates with the target application, wherein the target application previously received the contact options from the remote server, and
 displaying, by the at least one processor, a plurality of contact options on the sharing interface of the target application, each of the contact options responsive to a third input signal and respectively associated with a corresponding contact, wherein the corresponding contact is associated with the target application and an account in a server configured to communicate with the terminal device through the target application;

triggering, by the at least one processor, a contact selection operation in response to the third input signal by selecting a plurality of the contact options;

generating, by the at least one processor, a sharing message in response to the contact selection operation, the sharing message comprising a preview image of the web page and a plurality of identifiers corresponding to the selected contacts options; and sending, by the at least one processor, the sharing message to the selected contact through the remote server.

5. The method of claim 4, wherein the displaying of the plurality of contact options further comprises:
 sending a request of obtaining a plurality of contacts of the user to the remote server via the target application;
 receiving a response to the request from the remote server including information of the plurality of contacts; and
 displaying the plurality of contacts as the plurality of contact options on the sharing interface.

6. The method of claim 4, further comprising:
 receiving, by the at least one processor, a sharing message from a contact associated with the target application through the remote server based on an identifier of the contact;
 retrieving, by at least one processor, a sharing content from the sharing message; and
 displaying, by at least one processor, the sharing content on the terminal device.

7. An apparatus, comprising:
 at least one non-transitory processor-readable storage medium including at least one set of instructions for content sharing; and
 at least one processor in communication with the at least one non-transitory processor-readable storage medium configured to execute the at least one set of instructions to:
 display, in a first area of a touch screen, a web page loaded by a web browser application running concurrent with a plurality of messaging applications separate from the web browser application;
 display a sharing control and an address bar integrated in the web browser application in a second area of the touch screen, the second area of the touch screen separate from the first area of the touch screen;
 receive a triggering operation executed on the sharing control from a first input signal detected on from the touch screen;
 display a candidate menu of the web browser application in response to the triggering operation, a first portion of the candidate menu included in the first area of the touch screen and a second portion of the candidate menu included in the second area of the touch screen, the candidate menu including candidate icons provided by the candidate menu separate from the web page, the candidate icons corresponding to respective sharing interfaces, each of the respective sharing interfaces configured to independently communicate with a corresponding one of the messaging applications;
 in response to detection of a second input on the touch screen directed at a candidate icon corresponding to a target application of the messaging applications:
 receive, from the target application, a plurality of contact options, wherein each of the contact options are associated with an account in a remote server that communicates with the target application, wherein the target application previously received the contact options from the remote server, and
 display a sharing interface configured to communicate with the target application of the messaging applications, the candidate icon included in the candidate icons, the sharing interface including a plurality of contact options, each of the plurality of contact options responsive to a user input and associated with a corresponding user contact, wherein the corresponding user contact is associated with the target application and has an account in a server configured to communicate with the apparatus through the target application;
 receive a selection operation indicative of a plurality of selected contact options from the contact options displayed on the sharing interface;
 generate a sharing message comprising a plurality of contacts identifiers corresponding to the selected contact options, and at least one of a link directing towards a content of the web page, an abstract of the content, and a preview image of an entirety of the web page displayed in the first area of the touch screens;
 communicate the sharing message to the target application from the sharing interface;
 send the sharing message from the target application to a user contact corresponding to the contact option through the remote server; and
 close, automatically in response to sending the sharing message, the sharing interface without closing the target application.

8. The apparatus of claim 7, wherein
the target application includes an instant messaging application.

9. The apparatus of claim 7, wherein to display the sharing interface, the at least one processor is further configured to execute the at least one set of instructions to:
 send, from the target application, a request of obtaining user contacts associated with the plurality of contact options to the remote server via the sharing interface of the target application;
 receive a response to the request from the remote server including information of the user contacts; and display the information of the user contacts as the contact options on the sharing interface of the target application.

10. The apparatus of claim 7, wherein the sharing message is generated in response to detection of the selection operation.

11. The apparatus of claim 7, wherein the at least one processor is further configured to execute the at least one set of instructions to:
   receive a sharing message from a device associated with one of the plurality of contact options through the remote server based on an identifier of the device;
   retrieve a sharing content from the sharing message; and
   display the sharing content on the apparatus.

12. The method of claim 4, wherein the step of displaying the candidate menu further comprises:
   displaying the candidate menu on an interface positioned over a portion of the web page without adjusting the web page.

13. The apparatus of claim 7, wherein the target application comprises an instant messaging application executed on the apparatus.

* * * * *